United States Patent Office 2,962,247
Patented Nov. 29, 1960

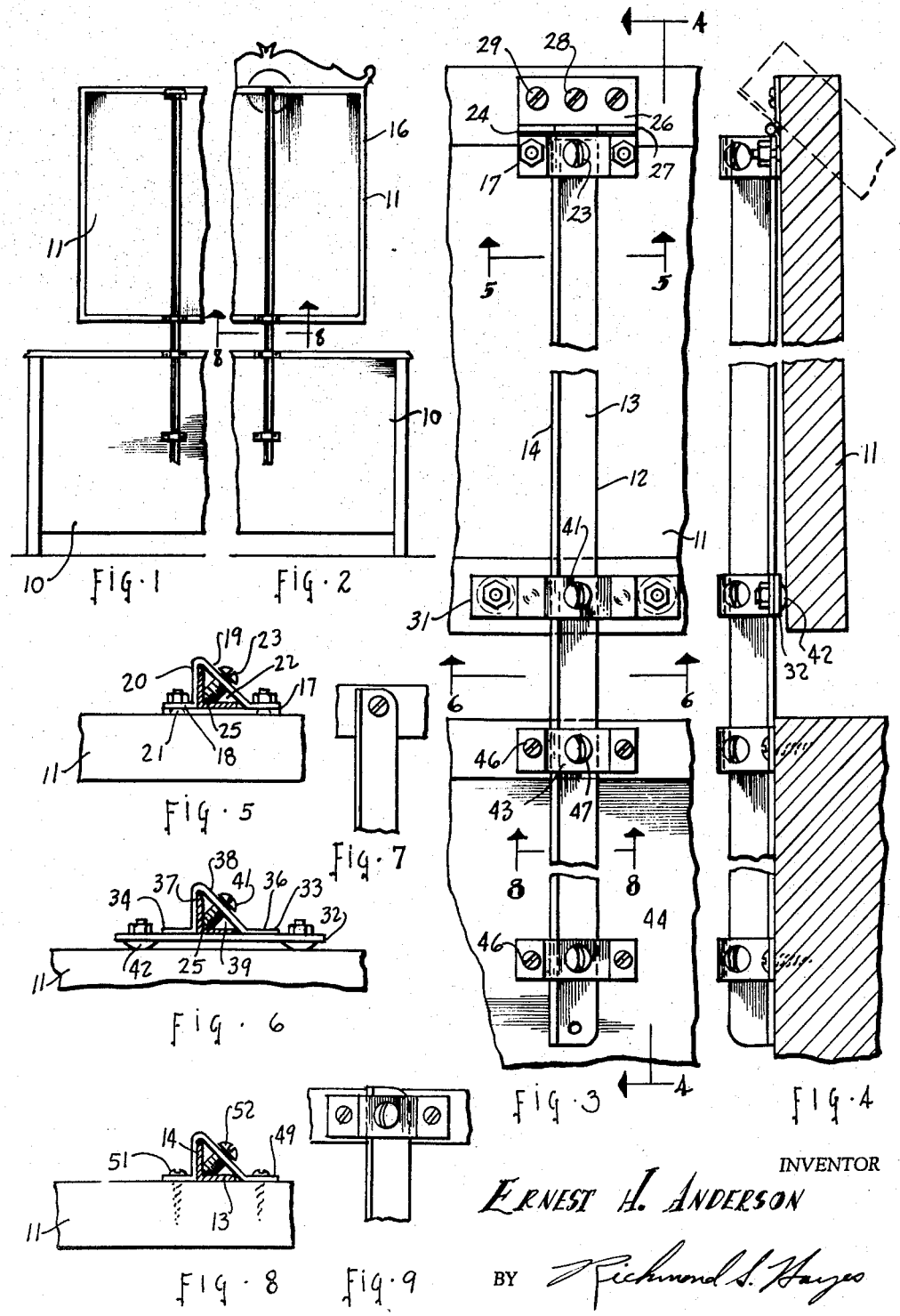

2,962,247
MIRROR SUPPORT

Ernest H. Anderson, 225 Bowen St., Jamestown, N.Y.

Filed Mar. 27, 1959, Ser. No. 802,486

2 Claims. (Cl. 248—28)

This invention relates to improvements in supports for mirrors or the like. More particularly, the invention is directed to the provision of a support that may mount a mirror above a dresser, bureau, vanity table, or similar article, in a convenient position of use and is a continuation in part of my pending application Serial No. 454,048, filed September 3, 1954, now abandoned.

Although it is well known that mirror supports, of the general type to which the present invention relates, have heretofore been manufactured and sold, it is believed that many of these supports are not only costly to manufacture and somewhat difficult to assemble and adjust, but do not provide satisfactory mounting over a continued period of use. Examination of relevant prior disclosures clearly points to the fact that there is considerable room for improvement in the design of mirror supports with particular emphasis directed to simplicity, ease of installation and ruggedness.

It is therefore one of the objects of the invention to provide a support for a mirror that is strong, of simple construction, and relatively inconspicuous when in use.

Another object of the invention lies in the provision of a support for a mirror that may be quickly and easily installed without the aid of special tools or equipment.

A further object of the invention lies in the provision of a support for a mirror that is sufficiently rugged to be capable of sustaining the weight of as large and heavy a mirror as may be required for dressers, vanity tables, and similar articles.

A still further object of the invention lies in the provision of a mirror support that enables tilting or adjusting a mirror out of vertical position and to an extent within ordinarily desirable limits.

Other and further objects of the invention will be more fully understood from a consideration of the following specification, taken in conjunction with the accompanying drawing; in which Fig. 1 is a rear elevational view of one modification of the invention, showing it supporting a mirror for pivotal movement above a dresser or similar article of furniture;

Fig. 2 is a view similar to Fig. 1, showing a support that rigidly mounts a mirror above a dresser or other article;

Fig. 3 is a greatly enlarged rear elevational view of the support, substantially as it is shown in Fig. 1;

Fig. 4 is a side elevational view of the structure shown in Fig. 2, being taken substantially as suggested by the lines 4—4 of that figure;

Fig. 5 is a transverse sectional view taken substantially as indicated by the line 5—5 of Fig. 3;

Fig. 6 is a further transverse sectional view, taken substantially as indicated by the line 6—6 of Fig. 2;

Fig. 7 is an enlarged fragmentary elevational view showing a simplified manner of attaching a mirror to a support (see circle—Fig. 2);

Fig. 8 is an enlarged transverse sectional view taken substantially on the line 8—8 of Fig. 2, see also line 8—8 of Fig. 3; and Fig. 9 is an enlarged fragmentary elevational view showing use of one of the brackets to attach the support to a mirror.

Referring more particularly to the drawing, the reference numeral 10 is employed to generally designate an article of furniture, such as a bureau, chest, dresser, or the like, to which a mirror 11 is usually secured. (See Figs. 1 and 2.) It has long since been the practice, in the manufacture of articles of furniture with which mirrors are associated, to eliminate the conventional mirror supporting post and provide instead one or more nearly concealed supports for a mirror that would not detract from the attractive appearance of the article when the mirror is mounted.

The invention, in one form, is clearly shown in Fig. 3 of the drawing. Herein a support 12 is provided. This support, of course, necessarily is sufficiently rugged as to be non-twistable and non-bendable and, in the present instance, is made so by producing it as a right-angle bar having integral flanges 13 and 14. Due to the fact that substantially all currently manufactured mirrors have only a very narrow back frame, such as indicated at 16, it is necessary to attach the mirror to the support along the top and bottom portions of such a frame. In one present disclosure, it is not only proposed to attach the mirror to the support 12, but also to make possible a slight vertical tilting of the mirror in order to accommodate it to persons of different height or requiring different use. To this end, there is provided a bracket 17 which includes a pair of mounting flanges 18 connected by an inclined flange 19, and a perpendicular flange 20. Secured in any suitable manner to the under faces of the flanges 18, is a plate 21 which, when in position, provides a triangular opening 22 extending transversely of the bracket. Centrally of the inclined flange is an opening through which is threaded a screw 23. For one purpose of the invention, the plate 21 may be considered as one leaf of a hinge, generally designated as 24. The other leaf 26 of this hinge is connected in the usual manner, as at 27, with the plate 21. The leaf 26 may be attached to the upper rail of the mirror frame 16 by a central screw 28, in which case the bracket and mirror would be relatively swingable; or by screws 29, which would make the leaf 26 rigid with the mirror frame. The advantages of securing the leaf 26 by one or more screws will be more fully brought out.

Since the mirror 11, as shown in Figs. 3 and 4, is intended to be hingedly secured at its upper end to the support 12, no permanent fastenings are required along its lower frame rail. However, the invention contemplates provision of a brace, such as indicated at 31, which will serve the dual purpose of preventing the mirror from twisting, particularly when a single support is provided, and which may be adjusted vertically of the support to effect a measure of tilting of the mirror about the hinge 24. This brace includes a base plate 32, similar to, but preferably longer than, the plate 21 previously described. A bracket 33 is attached to the plate, this bracket, for all purposes, being identical with the bracket 17 which has been described as forming a part of the hinge 24. Bracket 33 is permanently joined to the plate 32 along its flanges 34 and 36, these flanges being connected by an integral, vertical portion 37 and an inclined portion 38. Bracket 33 and plate 32 combine to form a triangular opening 39, through which the support 12 may be projected and, of course, the inclined wall mounts a screw 41. The ends of the plate 32, on the face opposite the bracket 33, are fitted with somewhat pliant bumpers 42. These bumpers may be of any size and are intended to contact, without damage, any portion of the rear of the mirror.

A further pair of brackets 43 and 44 are provided for the purpose of securing the support 12 to the rear, vertical wall of the article 10. These brackets may, in all respects, be identical with either bracket 17 or bracket 33 and are secured to the article by suitable screws 46. Herein, however, the flange 13 of the support rests directly against the vertical wall of the article which, with the inclined and vertical portion of the brackets, provides transverse, triangular openings through which the support may be projected. Of course, the inclined wall of each bracket is fitted with a screw 47.

To mount the mirror 11, utilizing the structure above described, it is found convenient to attach the leaf 26 of the hinge 24 to the upper rail of the mirror frame 16 by one or more screws 29. The upper end of the support 12 is now projected into the bracket 17 to approximately the bracket's width. Screw 23 is now turned down with the pointed end 25 thereof in pressure engagement with the support 12 at the meeting angle of flanges 13 and 14. Sufficient pressure can be applied, through the screw 23, to the support to frictionally secure the support against disengagement from the bracket. It is next suggested that the brace 31 be slid out of the support 12 and moved along said support to a position such that the bumpers 42 thereof are enabled to contact the lower rail of the mirror frame 16. Screw 41, when turned down secures this brace in desired position on the support. Brackets 43 and 44 may now be attached to the rear wall of the article 10 by means of screws 46. The mirror and support may now be raised into an upright position and the lower end of the support projected downwardly through brackets 43 and 44. When the base of the mirror is located a desired distance above the top of the article, screws 47 of the brackets 43 and 44 may be turned down to lock the support and the mirror against displacement.

Referring more particularly to Fig. 4, it will be noted that the bumpers 42 hold the mirror at a very slight incline. At any time, should it be found desirable to increase this incline, screw 41 may be loosened and the brace 31 slid upwardly along the support to bring the bumpers 42 closer to the hinged edge of the mirror. Such movement of the brace will swing the mirror outwardly and, when the desired slant has been attained, screw 41 is turned down to again lock the brace on the support.

Attention is now more particularly directed to Figs. 2 and 7 to 9, inclusive, wherein the angle bar, which constitutes the support 12, is attached to the mirror 11 in a somewhat different manner. As shown in Fig. 7, it is evident that the upper end of the support 12 may have an opening in one of its flanges, such as flange 13, and a screw 48 may be utilized to directly join the support to the upper rail of the mirror frame 16. The lower rail 16 of the mirror is provided with a bracket 49, identical to either of the brackets 43 or 44, being secured to said rail by screws 51. As already mentioned, either of these brackets is identical with brackets 17 or 33, without plates 21 or 32. Of course, the support 12, before being attached to the upper rail of the mirror, is projected through the bracket 49 and, when screw 48 has been engaged with the mirror rail, screw 52 on the bracket 49 may be turned down to secure mirror and support against relative displacement. As in the other showing of the invention, two additional brackets, such as 43, 46, or 49, may be secured to the rear of the article 10 and, when the support on the mirror is projected through these brackets, it can be secured in place by the simple expedient of turning down screw 52.

The advantages believed to reside in the simplified structure embodied in the angle bar support 12 and the brackets, such as 17, 33, 43, and 49, to provide an economical and rugged mirror support, are further exemplified in Fig. 9. Herein, a bracket 49 is shown secured to the top rail 16 of the mirror frame by the screws 51. Also, another bracket 49 would be secured to the lower frame rail 16 as previously described. When these brackets are in place, it is merely necessary to project the support 12 through the bracket openings and, when screws 52 are turned down, the support and mirror will be securely joined.

It is pointed out that the basis of the invention is the provision of an extremely simple, economical, and rugged mirror support, and that by combining a simple bracket, having a triangular passageway therethrough, with an angle bar, applicant has produced such a support. Furthermore, as shown in certain of the figures of the drawing, this basically simple support may be modified to an extent to mount a top-hung swingable mirror. As already described, this is accomplished by utilizing the same brackets in conjunction with a hinge 24 and a brace 31.

Although applicant has shown and described a mirror support consisting of an angle bar with cooperative brackets and a modification of the brackets to enable mounting a swingable mirror, it will be understood that variations may be made in the structure without in any way departing from the spirit and scope of the invention as set out in the annexed claims.

Having thus set forth my invention, what I claim as new and for which I desire protection by Letters Patent is:

1. A support for mounting a mirror over an article of furniture comprising an elongated bar that, in cross section, consists of a pair of integral substantially right angle flanges, a bracket consisting of spaced mounting flanges, an inclined flange and a perpendicular flange connecting said mounting flanges, the inclined and perpendicular flanges cooperating to provide a transverse enclosure for receiving said bar, a screw carried by and being perpendicular to said inclined flange, said screw being movable in a direction to engage said bar substantially at the meeting point of the flanges thereof whereby to secure said bar against movement with respect to said bracket.

2. Supporting structure for a mirror comprising an elongated bar consisting of a pair of integral substantially right angle flanges, a strap-like bracket having ends attachable to the rear of said mirror, the central portion of said bracket being offset from said ends and consisting of integral inclined and perpendicular flanges, said central portion, when said bracket is attached to said mirror, providing a transverse triangular enclosure for receiving said bar with one of said bar flanges parallel to said perpendicular flange, a threaded screw projecting through said inclined flange into engagement with said bar at the base of the angle formed by said bar flanges, said screw, when advanced, urging said bar into pressure contact with said perpendicular flange and the rear of said mirror.

References Cited in the file of this patent
UNITED STATES PATENTS

| | | |
|---|---|---|
| 2,313,532 | Garrett | Mar. 9, 1943 |
| 2,598,531 | Garrett | May 27, 1952 |
| 2,612,695 | Schneider et al. | Oct. 7, 1952 |